United States Patent
Struzik

(10) Patent No.: US 8,554,460 B2
(45) Date of Patent: Oct. 8, 2013

(54) AIRCRAFT FUEL OPTIMIZATION FOR MULTI-STOP ROUTES

(71) Applicant: Anthony Struzik, Plano, TX (US)

(72) Inventor: Anthony Struzik, Plano, TX (US)

(*) Notice: Subject to any disclaimer, the term of this patent is extended or adjusted under 35 U.S.C. 154(b) by 0 days.

(21) Appl. No.: 13/714,348

(22) Filed: Dec. 13, 2012

(65) Prior Publication Data

US 2013/0197791 A1    Aug. 1, 2013

Related U.S. Application Data

(60) Provisional application No. 61/592,119, filed on Jan. 30, 2012.

(51) Int. Cl.
*G06F 19/00*    (2011.01)

(52) U.S. Cl.
USPC ............................................. 701/123

(58) Field of Classification Search
None
See application file for complete search history.

(56) References Cited

U.S. PATENT DOCUMENTS

| | | | |
|---|---|---|---|
| 4,642,775 A * | 2/1987 | Cline et al. | 701/528 |
| 2009/0150012 A1* | 6/2009 | Agam et al. | 701/3 |
| 2010/0191458 A1 | 7/2010 | Baker et al. | |

* cited by examiner

*Primary Examiner* — Thomas Tarcza
*Assistant Examiner* — Adam Alharbi
(74) *Attorney, Agent, or Firm* — Gerard M. Donovan; Reed Smith LLP

(57) ABSTRACT

Computer-implemented systems, methods, and computer-readable media for reducing operational costs relating to fuel burn of aircraft include receiving trip data specifying an origin, an intermediate destination, and a final destination from a client device; receiving operational data from one or more computing device; performing optimization logic to determine an optimized route having a minimized fuel cost, the optimized route specifying how much fuel to purchase at each of an origin airport, an intermediate destination airport, and a final destination airport; and transmitting the optimized route to the client device.

20 Claims, 12 Drawing Sheets

TRIP SUMMARY

Aircraft: Lear 31A and/or Registration Number
Trip Route(s): KPHF-KBAL-KLAS-KMRY
Total Cruise Time: (not including stops): 06:06 (hh:mm)
Upload Fuel Cost: $4,933.89
Number of Stops: 2
Total Distance: 2281.62 nm
Total Fuel Burn: 5642.29 lbs/835.89 gal
Total $CO_2$ Emitted: 8.08 tonnes
Tankering Opportunity: Yes. SAVE up to $185.00 on Leg 3; up to $21.00 on Leg 2
Flight Level: 390

Low Cost/Fastest Time Route: KPHF Newport News/Williamsburg Intl to KMRY Monterey, CA

FIG. 4

Leg: 1
From: KPHF Newport News/Williamsburg Intl. - Newport News, VA
To: KDAL Dallas Love Field - Dallas, TX

Flight Information
Leg flight time (est.): 2 hour(s) 44 minute(s)
Leg Distance: 1031.65 nm
Avg. Airspeed: 415.84 knots

Fuel Information
Current Fuel: 0 lbs. (0 gal)
Upload Quantity: 3450.05 lbs. (511.12 gal)
Takeoff Fuel: 3450.05 lbs. (514.93 gal)
Tankering Opportunity: No

FBO Information
Rick Aviation Inc.
Best Fuel Price (per gal): $5.20
Upload Fuel Cost (est.): $2,657.82

Fuel Burn and Weight Information
Takeoff Weight: 14464.05 lbs.
Arrival Weight: 11938.72 lbs.
Arrival Fuel: 924.72 lbs. (137 gal) Arrival fuel includes a 45-minute reserve
Fuel Burn: 2525.33 lbs. (374.12 gal)
Co2 emitted: 3.62 tonnes

FIG. 5A

Leg: 2
From: KDAL Dallas Love Field - Dallas, TX
To: KLAS Mc Carran Intl - Las Vegas, NV

Flight Information
Leg flight time (est.): 2 hour(s) 23 minute(s)
Leg Distance: 924.95 nm
Avg. Airspeed: 434.7 knots

Fuel Information
Current Fuel: 924.72 lbs. (137 gal)
Upload Quantity: 3116.96 lbs. (416.77 gal)
Takeoff Fuel: 4041.68 lbs. (603.24 gal)
Tankering Opportunity: 12 gal can save up to $21.00

FBO Information
TAS Signature Aviation Inc.
Best Fuel Price (per gal): $4.93
Upload Fuel Cost (est.): $2,276.07

Fuel burn and Weight Information
Takeoff Weight: 15055.68 lbs.
Arrival Weight: 12856.89 lbs.
Arrival Fuel: 1842.89 lbs. (273.02 gal) Arrival fuel includes a 45-minute reserve
Fuel Burn: 2198.79 lbs. (325.75 gal)
$CO_2$ emitted: 3.15 tonnes

FIG. 5B

Leg: 3
From: KLAS Mc Carran Intl - Las Vegas, NV
To: KMRY Monterey Peninsula – Monterey, CA

Flight Information
Leg flight time (est.): 0 hour(s) 60 minute(s)
Leg Distance: 325.01 nm
Avg. Airspeed: 437.48 knots

Fuel Information
Current Fuel: 1842.89 lbs. (273.02 gal)
Upload Quantity: 0 lbs. (0 gal)
Takeoff Fuel: 1842.89 lbs. (275.06 gal)
Tankering Opportunity: 337 gal.

FBO Information
TAS Signature Aviation Inc.
Best Fuel Price (per gal): $6.16
Upload Fuel Cost (est.): $0.00

Fuel burn and Weight Information
Takeoff Weight: 12856.89 lbs.
Arrival Weight 11938.72 lbs.
Arrival Fuel: 942.72 lbs. (137 gal) Arrival fuel includes a 45-minute reserve
Fuel Burn: 918.17 lbs. (136.03 gal)
$CO_2$ emitted: 1.32 tonnes

FIG. 5C

|  | Air Charter | | | | | |
|---|---|---|---|---|---|---|
|  | Hourly Operating Costs | | | | | |
|  | Part 135 | | | | | |
|  |  | | | | | |
|  | Aircraft Type/Model | | | | Annual | |
|  | Aircraft SN | | | Hours | Hours | |
|  | Aircraft Tail # | | | 40 | 480 | |
|  | Aircraft Owner | | | | | |
|  |  | | | | | |
|  |  | | | | | |
|  |  | | | | | |
|  | Hourly Burn/gal | Price/gal | | | Per Hour/$ | |
| Fuel | 525 | $6.95 | | | 3,649 | 48.7% |
|  |  | | | | | |
| Engine reserves |  | | | | 660 | 8.8% |
| Labor reserves |  | 2:1 ratio | | | 200 | 2.7% |
| Smart Parts |  | | | | 772 | 10.3% |
| Airframe Reserves |  | | | | 75 | 1.0% |
| APU |  | | | | 59 | 0.8% |
| Maintenance Initial |  | | | | 0 | 0.0% |
| Maint Labor Expense |  | | | | 0 | 0.0% |
|  |  | | | | 1,766 | 23.6% |
|  |  | | | | | |
| Line Maintenance |  | .5 FTE @ | 45,000 | | 94 | 1.3% |
|  |  | | | | | |
| Captain |  | 1 FTE @ | 100,000 | | 208 | 2.8% |
| Second In Command |  | 1 FTE @ | 125,000 | | 260 | 3.5% |
| First Officer |  | 1 FTE @ | 0 | | 0 | 0.0% |
| Flight Attendant |  | 1 FTE @ | 80,000 | | 167 | 2.2% |
|  |  | | 305,000 | | 635 | 8.5% |
|  |  | | | | | |
| Benefits and Taxes |  | 32.50% | | | 237 | 3.2% |
|  |  | | | | | |
| Training | Full service - 2 | | 108,000 | | 225 | 3.0% |
|  |  | | | | | |
| Insurance | Hull | | 80,160 | | 167 | 2.2% |
|  | Liability | | | | | |
| Hangar Expense |  | | 60,000 | | 125 | 1.7% |
| Office Lease/Rental |  | | | | 0 | 0.0% |
| Misc Office Expense |  | | | | 0 | 0.0% |
| Advertising |  | | | | 0 | 0.0% |
| Maint. Software Programs |  | | | | 0 | 0.0% |
| Misc Trip Expense |  | | | | 0 | 0.0% |
| Parts shipping |  | | | | 25 | 0.3% |
|  |  | | | | | |
|  |  | | | | | |
| Flight OPS Overhead |  | | | | 576 | 7.7% |
|  |  | | | | | |
| Total Operating Costs Per Hour |  | | | | 7,499 | 100.0% |

FIG. 9A

| Third Party Fee(s) |
| --- |
| Administration Fee |
| Advance Deposit -Hotel |
| Air Navigation/Overflight Permission Assistance |
| Airport Slots |
| Catering |
| Communications |
| Crew Ramp Transportation |
| Crew Transportation |
| Disbursement Fee - Local Agent |
| Handling Fees |
| Hotel No Show / Cancellation Penalty |
| Landing Fees |
| Last Minutes Catering Cancellation Fee |
| Parking Fees |
| Overflight Permission Assistance |
| Push Out Fee |
| Unskilled Labour/Chocks |
| VAT |

FIG. 9B

US 8,554,460 B2

AIRCRAFT FUEL OPTIMIZATION FOR MULTI-STOP ROUTES

PRIORITY CLAIM

This application claims priority to the U.S. provisional patent application 61/592,119, filed Jan. 30, 2012, which is hereby incorporated by reference.

BACKGROUND

The cost of fuel has one of the most significant impacts on the operating costs of an aircraft. However, many variable factors that bear on both fuel costs and fuel utilization make minimizing fuel costs a difficult task. If a pilot simply uploads fuel at the lowest price at a Fixed Base Operator ("FBO") at their origination airport, they could miss taking advantage of an even lower priced fuel opportunity at an FBO along the way to their final destination. On the other hand, a pilot cannot always reduce their total fuel cost by simply flying to the least expensive FBO while on the way to their destination because the additional fuel burned due to the further distance traveled and the additional weight of the fuel upload, both of which may vary based on factors such as altitude, weather, and speed, increase the fuel burned to get back to the planned route and may not make a significant impact on the total cost of the flight. There is even greater potential to minimize fuel costs when the aircraft is scheduled to stop at multiple destinations. However, because of the number of factors that affect fuel costs and optimization coupled with the inability of pilots to easily access the necessary data, pilots currently have to rely on the input from several sources that only marginally improve operating costs because the data may not be current.

For example, US published patent application 2010/0191458 discloses using systems for calculating routes between an origination airport and a destination airport to reduce fuel costs. However, such systems only optimize fuel costs from a single origin to a single destination. Thus, such systems may direct a pilot to fill their aircraft at a "cheapest" FBO when in fact the aircraft may stop at a cheaper FBO at a later destination.

Improved aircraft fuel optimization systems and methods are desired.

BRIEF DESCRIPTION OF THE DRAWINGS

FIG. 3 illustrates an exemplary user interface configured to allow a pilot to enter trip data and submit the trip data to a system for determining an optimized trip route.

FIG. 4 shows an exemplary trip summary of an optimized flight path determined in response to the trip data input in FIG. 3.

FIGS. 5A-5C illustrates the sub-trips of the exemplary trip summarized in FIG. 4.

FIGS. 9A-9B illustrate details relating to operating costs of an air charter flight.

While systems and methods are described herein by way of examples and embodiments, those skilled in the art recognize that systems and methods for aircraft fuel optimization are not limited to the embodiments or drawings described. The drawings and descriptions are not intended to be limiting to the particular form disclosed. Rather, the intention is to cover all modifications, equivalents, and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

Disclosed embodiments provide systems, computer-implemented methods, and computer-readable media for aircraft fuel optimization. A flight planning embodiment may receive a multi-stop route, aircraft identification, and similar trip information from a pilot, receive real-time or near real-time operational data from one or more systems, determine one or more optimized route, and transmit the one or more optimized route for display to the pilot. Thus, embodiments may allow a pilot to reduce his or her fuel cost across a multi-stop route.

Figure 1:
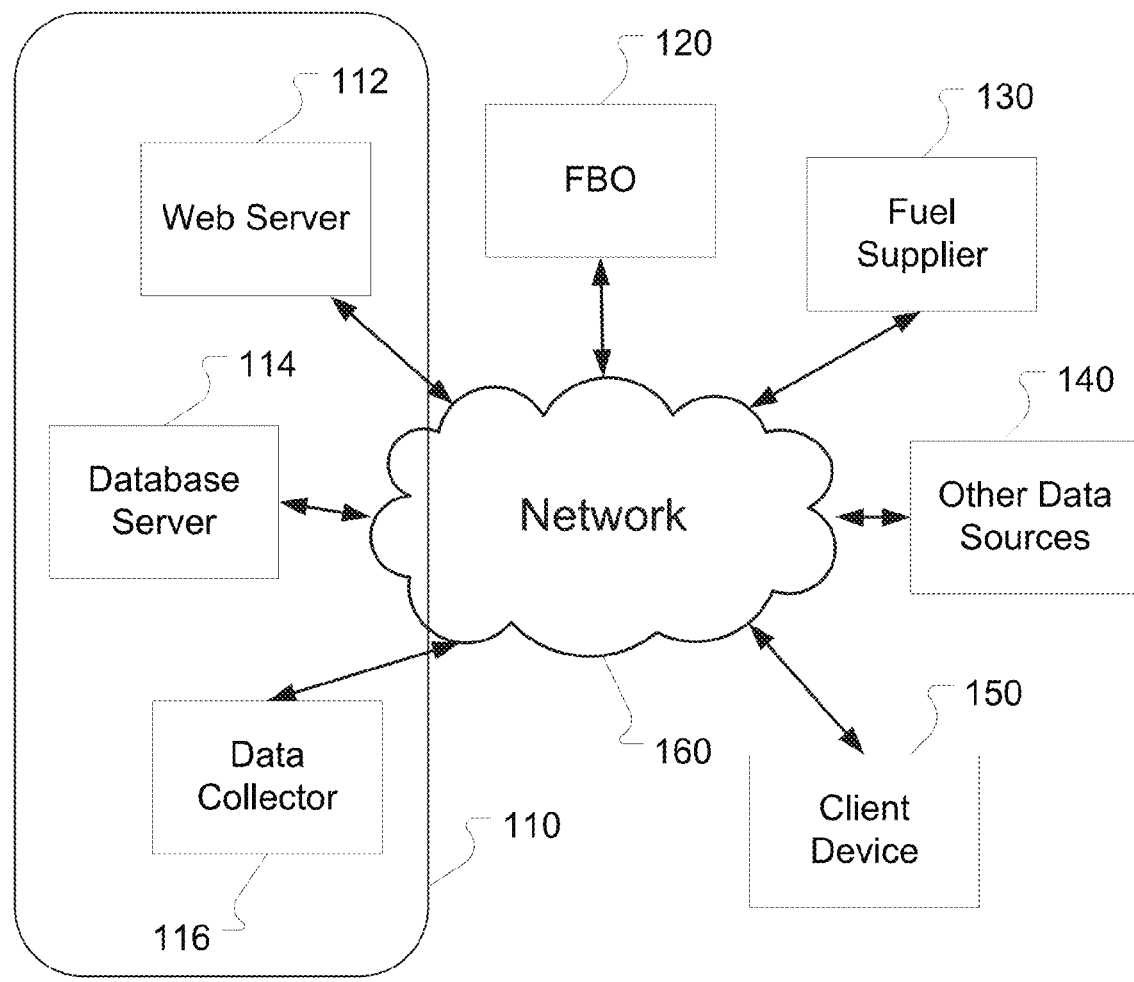
FIG. 1 illustrates an exemplary architecture for an aircraft fuel optimization system.

FIG. 1 illustrates an exemplary architecture for an aircraft fuel optimization system. A web server 112 may be configured to provide a user interface to allow a pilot using a client device 150 to enter trip data and, in response, receive optimized route data on the client device 150. Upon receiving trip data, web server 112 may pass the trip data to database server 114 for computation of one or more optimized route. Database server 114 may also receive operational data from, for example, one or more FBOs 120 (only one is shown in FIG. 1), one or more fuel suppliers 130 (only one is shown in FIG. 1), and one or more other data sources 140. Data collector 116 may be useful for retrieving operational data from the FBOs 120, fuel suppliers 130, and other data sources 140 and providing the retrieved operational data to database server 114. Database server 114 may then perform optimization logic (described below) to determine an optimized route. Database server 114 may then transmit one or more optimized route to web server 112 for transmission to the client device 150 and ultimately for display to the pilot.

The various computing devices shown in FIG. 1 may be combined into fewer devices, further subdivided, or otherwise divided according to business and design needs. For example, a server 110 (e.g., a virtual server hosted in the cloud, a single computing device, a cluster of computing devices, etc.) may perform the functionality of web server 112, database server 114, and data collector 116. Additionally, the various computing devices shown in FIG. 1 may be operatively coupled via one or more networks, such as the Internet, wireless networks, and the like.

Data collector 116 may be configured to retrieve real-time or near-real-time data from FBO 120, fuel suppliers 130 and other data sources 140 in an automated or manual fashion. In some embodiments, data collector 116 may automatically establish a data connection to one or more other computing devices to retrieve operational data (e.g., via an Application Programming Interface ("API") or via a direct database connection). In other embodiments, a person may call, email, or otherwise contact various FBOs, fuel suppliers, the Federal Aviation Administration ("FAA"), and the like and manually enter pricing, fuel availability, weather, and other operational data. Some embodiments may also utilize a combination (i.e., hybrid) of automated and manual systems for data collection.

Additionally, while FIG. 1 illustrates a web server 112 as hosting a page to allow a pilot to enter trip data and receive an optimized route, embodiments may be deployed in any fashion that allows for receipt of trip data and operational data, determination of an optimized route, and output of the optimized route to the pilot. For example, an application (e.g., an IOS or Android app) may allow a pilot to interact with an embodiment via a smartphone (e.g., an iPhone) or a tablet (e.g., an iPad). In other embodiments, a pilot may call into an automated voice system or may send Short Message Service ("SMS") messages to an automated system and, in response, receive an optimized route. Of course, any other communication devices may be utilized for the system to receive trip data and operational data, determine an optimized route, and output the optimized route.

As described herein, "pilot" refers to any user of a client computing device (i.e., "client") used to retrieve an optimized route according to embodiments described herein. The term "pilot" is not limited to a user who will be actually operating an aircraft. "Trip data" includes data specific to a trip that may be provided by a pilot, such as an origin airport, one or more destination airports, the type of aircraft (and any modifications if the aircraft deviates from standard specifications), a predetermined flight level, the amount of preexisting fuel in the aircraft, the planned date and time of the flight, the expected payload (e.g., passengers, cargo, etc.), and the like. In some embodiments, one or more of the trip data elements may have a default value or a pre-entered (e.g., saved) value while other trip data elements may be required to be entered by the pilot. "Operational data" includes the current (i.e., real-time or near-real-time) cost of fuel at various FBOs at the origin and destination airports, the weather forecasted for during the planned flight, the cost of fuel from fuel suppliers (e.g., Shell, BP, etc.), and the like. Data relating to airports (e.g., location, runway specifications, etc.), aircraft (e.g., required runway specifications, maximum fuel capacity, etc.), and the like may be stored in a local or remote database and may be periodically updated as such data changes or may be retrieved from an external data source as part of the operational data.

Embodiments may be configured to receive trip data, including an origin airport and a destination airport, retrieve real-time operational data, and compute an optimized route to minimize fuel cost. The trip data may include the aircraft, payload, origin and destination airports, and the like. The real-time operational data may include current weather, an accurate fuel pricing matrix for the airports along the way, and the like. Embodiments may then use the trip data and real-time operational data to compute an optimized route. In contrast to currently available systems, embodiments described herein may compute optimized flight routes based on real-time data. Previous systems were limited to attempting to calculate optimized routes based on historical flight data and fuel pricing input from the pilot and could not respond to last-minute changes. Further, the optimized route computed by embodiments does not merely direct a trip to purchase less expensive fuel. Rather, optimized routes described herein may provide holistic parameters for a route that minimizes operating costs. For example, the optimized route may provide the airports to stop at along the route and the FBO for fuel upload at one or more airports, a flight level (e.g., altitude or altitude range) for the flight between each airport, a cruise speed for the flight between each airport, and the like. Of course, a pilot may have the ability to override the optimized route (e.g., to fly at a different altitude than the optimized route altitude).

Embodiments may also be configured to receive trip data, including an origin airport, one or more intermediate destination airports, and a final destination airport, and operation data and to compute an optimized route to minimize fuel cost based on the trip data and operational data. In such embodiments, one or more computing devices may access the real-time or near-real-time fuel pricing at plural FBOs at each of the origin airport, one or more intermediate destination airports, and the final destination airport and determine how much fuel should be purchased at each respective airport. This determination may take into consideration the amount of fuel already in the plane, the amount of reserve fuel (i.e., a mandated volume of fuel required in addition to the fuel required to fly to the destination airport under expected conditions), the maximum fuel that can be carried while remaining under the maximum takeoff weight (the maximum takeoff weight being a function of at least some of the operating empty weight of the plane, the payload, the airfield temperature and altitude, the runway length and condition, obstacles, and other factors), and the price of fuel at each destination. Thus, embodiments may determine an optimized route including the amount of fuel to be purchased at each destination airport specified on the trip route.

Figure 2:
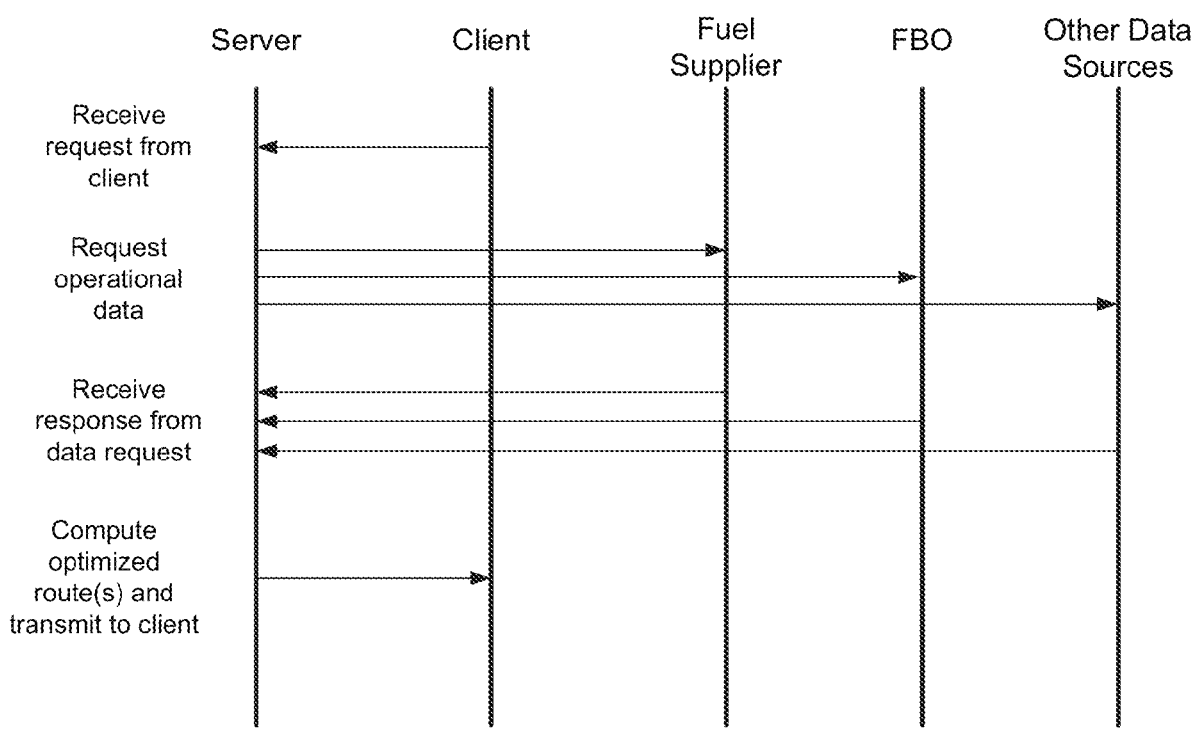
FIG. 2 illustrates an exemplary method for determining an optimized route.

FIG. 2 illustrates an exemplary method for determining an optimized route. First, a server receives a request for an optimized route from a client device. The request may include a final destination and one or more intermediate destinations, information about the aircraft, the planned flight level and the planned time of the flight. The server may then request operation data from a plurality of data sources, such as fuel suppliers, FBOs, and other data sources. The operation data may include fuel pricing, weather, data relating to the various destinations, and any other data useful for determining an optimized route. The server may then receive the operational data from the plurality of data sources in response to the request and process the received data to compute one or more optimized routes. The server may then transmit the one or more optimized routes to the client device for display to the pilot.

Some embodiments may be configured to allow a user to enter the required trip information in a user interface, compute optimized trip leg(s) to minimize fuel price, and promptly (e.g., in less than fifteen seconds) output the optimized trip to the client. Alternative embodiments may be configured to provide a plurality of optimal routes to a pilot to allow the pilot to select an optimal route of their choosing. Embodiments may also allow a pilot to select various criteria for an "optimized route," such as an optimized route for cheapest fuel price, an optimized route for fastest time-to-final-destination (e.g., avoiding multiple fuel uploads may decrease total travel time), and the like. The user may also have options to expand the search corridor to potentially further reduce operational costs (e.g., by locating less expensive fuel at airports in the expanded search corridor). Of course, alternative embodiments may offer other criteria for a user to select or input for a system to compute an optimized route according to the user's specific requirements.

FIG. 3 illustrates an exemplary user interface configured to allow a pilot to enter trip data and submit the trip data to a system for determining an optimized trip route. Such an interface may include a "required information" section including information necessary for the system to determine an optimized route. In the example of FIG. 3, some information, such as the departure data, Greenwich Mean Time ("GMT"), and weather values may be automatically generated by the system as real-time values. In other embodiments a pilot may be able to enter such values to retrieve an optimized route for a future time—however, such embodiments may provide less reliable results as operational conditions (e.g., weather, fuel pricing, etc.) may vary between the time the optimized route is determined and the time of the flight. Other values may be entered directly by the pilot, such as the route (e.g., the origin airport, the final destination airport, and optionally one or more intermediate destination airports), the aircraft type, the aircraft registration number, and the flight level. While FIG. 3 illustrates some inputs being configured to have a pilot type in text and other inputs being configured to allow a pilot to select from a drop-down menu, a pilot may input data in any conventional fashion.

A user interface may also include an "optional information" section including information that may additionally factor into a determination of an optimized route. The optional information may have default values but a pilot may alter the default values if their situation dictates. For example, optional information may include an amount (e.g., volume or weight) of fuel before upload (e.g., fuel already in the aircraft's tanks), a payload value, a planned cruise speed, a fuel reserve (e.g., amount of reserve fuel required by governing regulations), a fuel hold, a time estimate for taxi in-out, a minimum flight distance before fuel stop, a fuel search corridor (i.e., a magnetic variance from the direct great arc flight path where an additional refueling stop may be made), a Federal Aviation Regulation ("FAR") flight type, and an hourly operating cost (e.g., to weigh the additional time taken to acquire less expensive fuel against the reduced fuel cost). Of course, other embodiments may be configured to receive other or additional operational information.

The user interface may also have a presets section to allow a pilot to retrieve pre-entered information. This feature may be particularly useful when a pilot regularly flies the same route. It should be noted that while a pilot may regularly fly to and from the same airports, because of constantly varying weather and fuel pricing, an optimal route to minimize operational costs may change day to day or more often. Thus, the pilot may utilize the "presets" section to determine an optimized route in real-time or near-real-time to reduce his or her day-to-day operational costs.

Once the pilot submits the trip data (e.g., by selecting the "calculate route" control of FIG. 3), the system may perform optimization logic to determine one or more optimized flight path that minimizes operational costs. FIG. 4 shows an exemplary trip summary of an optimized flight path determined in response to the trip data input in FIG. 3. The trip summary of FIG. 4 provides a high-level summary of the optimized route, including each destination airport, the total cruise time, the total upload fuel cost (i.e., the operational cost due to additional fuel that must be purchased), and additional summary data. Embodiments may also provide the pilot with detailed optimized route data, as shown in FIGS. 5A through 5C.

FIGS. 5A-5C illustrate detailed summaries of the legs of the optimized route summarized in FIG. 4. For example, FIG. 5A illustrates the sub-trip from the origin airport to the first intermediate destination airport. This figure shows that of the various FBOs at KPHF, Rick Aviation Inc. has the best fuel price. Higher priced FBOs at KPHF are omitted from this exemplary detailed summary, however other embodiments may display more expensive FBOs to illustrate savings.

Unlike prior fuel optimization systems, these drawings illustrate that an optimized route for minimizing operational costs may include purchasing specific amounts of fuel at plural airports. For example, in the first sub-trip from KPHF to KDAL shown in FIG. 5A, the system directs the pilot to purchase about 3450 pounds of fuel at Rick Aviation for a total cost of $2,657. The system's optimization logic determined this amount because while Rick Aviation is the least expensive FBO at KPHF, TAS Signature Aviation Inc at KDAL is less expensive ($5.20 per gallon at Rick in KPHF versus $4.93 per gallon at TAS in KDAL). Thus, the first sub-trip of the route instructs the pilot to upload just enough fuel to both complete the first leg of the trip while having enough fuel remaining in the tank to meet the minimum reserve fuel requirements. The system may determine the appropriate volume of fuel to meet these criteria accounting for the aircrafts specifications, the payload, the weather, and any additional factors (described above).

Continuing on to FIGS. 5B and 5C, for the second sub-trip from KDAL to KLAS, the system instructs the pilot to upload enough fuel to not only complete the sub-trip with sufficient reserve fuel, but also to complete the final sub-trip from KLAS to KMRY. Embodiments may utilize optimization logic to determine that this is the optimized route because at KLAS the best priced FBO's best fuel price of $6.16 per gallon is greater than the best priced fuel at KDAL. Thus, the embodiment instructs the pilot to upload about 3117 pounds of fuel at TAS at KDAL, which under the current operating conditions is determined to be enough to travel the second leg of the trip from KDAL to KLAS (which will require about 2199 pounds of fuel under the current operating conditions), travel the third leg of the trip from KLAS to KMRY (which will require about 918 pounds of fuel under the current operating conditions), and still have the minimum required reserve fuel at the final destination airport (about 943 pounds of fuel under the current operating conditions). In the final sub-trip from KLAS to KMRY the pilot is then not required to upload any fuel. Thus, embodiments may reduce the overall operational cost of a multi-destination trip by determining an optimal route including an amount of fuel to purchase at each airport.

The above exemplary embodiment refers to a final destination and intermediate destinations rather than a final destination airport and intermediate destination airports to illustrate that embodiments may be used with an assortment of location or airport data. For example, in some embodiments a pilot may input location data in conventional fashion (e.g., via a nearby locale (e.g., a city) or via direct coordinates (e.g., latitude and longitude)). In such embodiments, the system may determine the nearest airport or, if plural airports are near the input location, the system may provide the pilot with a user interface to allow the pilot to select one of plural airports near the input location.

Embodiments may also be configured to determine additional information related to a multi-destination optimized route. For example, embodiments may determine the carbon dioxide emitted during each leg or over the entire optimized route. This may be useful, for example, for regions implementing carbon caps or taxes.

Figure 6:
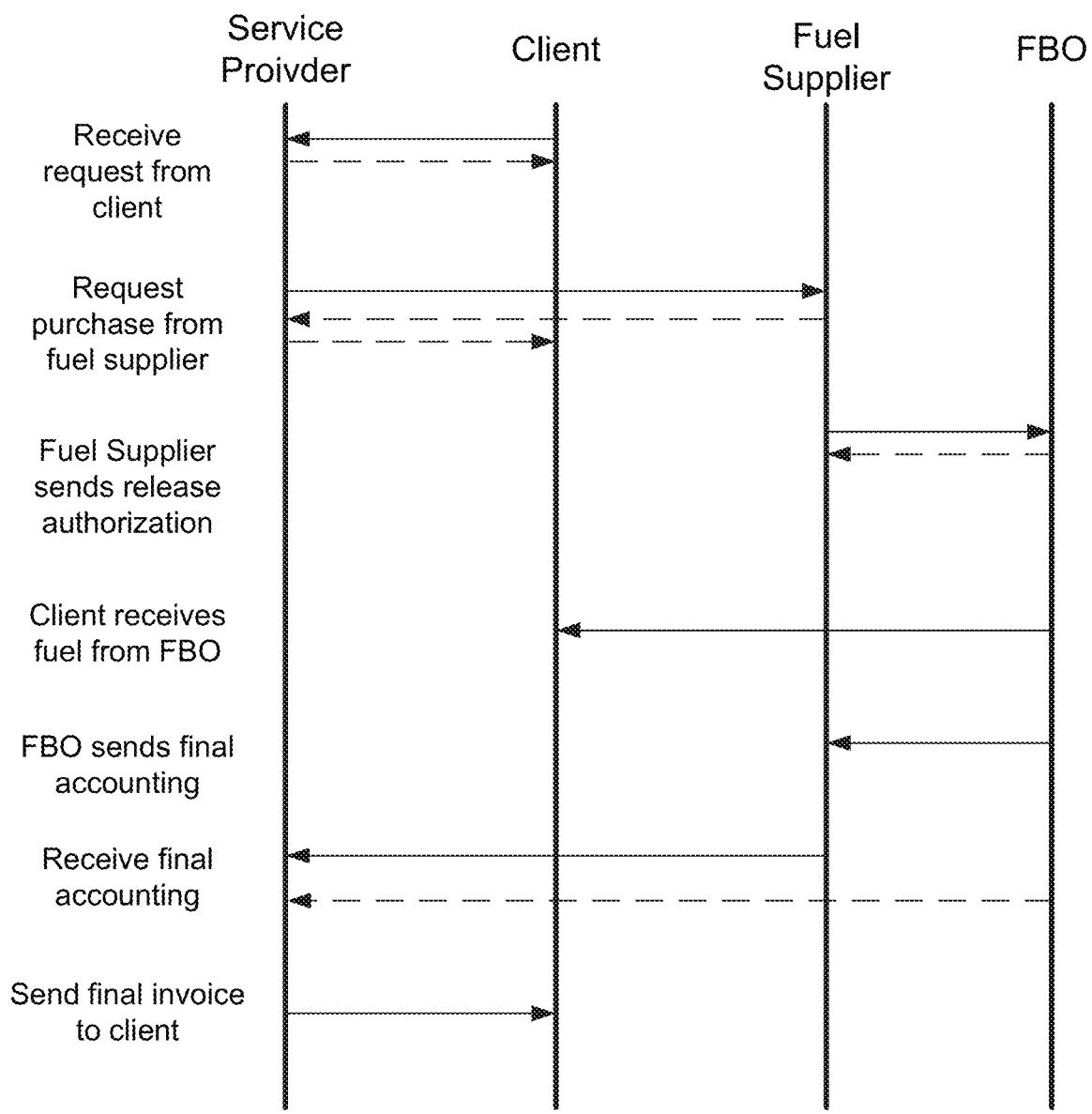
FIG. 6 illustrates a system for further optimized routes based on volume price breaks for fuel.

The embodiments described herein may be useful for a pilot to reduce their operational costs associated with a multi-destination trip. Embodiments may provide further savings by allowing for volume fuel purchases directly from fuel suppliers to further reduce the cost of fuel even below that of the best-priced FBO at an airport. For example, embodiments may allow a pilot to pre-order the fuel amount specified in the optimal route (e.g., the fuel amounts specified for each of the sub-trips shown in FIGS. 5A-5C). The fuel may then be purchased directly from a fuel supplier (e.g., Shell) at a volume discount and then uploaded by the pilot at an FBO in conventional fashion. FIG. 6 illustrates such a system for further optimized routes based on volume price breaks for fuel.

In FIG. 6, first a service provider may receive a request from a client to purchase the fuel according to an optimized route. For example, the service provider may have already determined an optimized route (as discussed above with reference to FIGS. 3-5) and the pilot may have indicated that they wish to pre-order the fuel according to the optimized route at an additional volume discount. Alternatively, a pilot may simply enter one or more destinations into an interface and in a single step the service provider may both determine an optimized route and pre-order the fuel for the optimized route. The pilot may, for example, authorize the order by providing a credit card or account number. This may enable the pilot to upload a volume of fuel at his or her discretion (optionally, the pilot may upload more or less fuel than is recommended for the optimized route). The service provider may send a confirmation of receipt of the request back to the client.

Next, the service provider may request to purchase the fuel directly from a fuel supplier that supplies fuel to an FBO at an airport where the pilot will fill the aircraft specifying both a price and volume. For example, Shell may be a fuel supplier for the FBO TAS Signature Aviation at KDAL as shown in FIG. 5B above. Thus, the service provider may order the upload quantity of fuel from the fuel supplier directly. The fuel supplier may send a confirmation of the order to the service provider and the service provider may optionally send a confirmation back to the pilot. The fuel supplier may then contact the FBO and authorize release of the fuel (e.g., by specifying the aircraft to receive the fuel). Thus, when the pilot arrives at the specified FBO, they may upload at least the pre-arranged amount of fuel and they may receive the fuel at the price the server provided. Beneficially, the service provider may negotiate a better price than the FBO by negotiating better pricing directly with the fuel supplier in return for placing higher volume orders (the higher volume orders in turn may be facilitated because a single service provider may contract with the fuel supplier to sell fuel through many FBOs). Once the aircraft completes the fuel upload, the FBO may send a final accounting of the amount of fuel to the fuel supplier. The fuel supplier may then indicate a total cost of the transaction to the service provider (i.e., the product of the volume and price). Optionally, either in addition or as an alternative, the FBO may directly provide an accounting to the service provider. Once the service provider receives the final accounting, it may charge the client for the total volume of fuel.

The process illustrated in FIG. 6 may provide benefits for all parties involved. Most directly, a pilot may benefit by purchasing fuel at a price lower than the FBO directly offers. Additionally, the FBO benefits by selling a greater volume of fuel (it should be noted that the FBO's mark-up for delivery of the fuel may be included in the price, however the fuel costs less to the pilot because the fuel supplier may provide a volume discount). The FBO may also benefit by selling peripheral products or services to the pilot or crew when they arrive to upload fuel. The fuel suppliers benefit by increased demand. In other words, while the fuel supplier may offer fuel at a lower per-capita price, in return the fuel supplier is selling a greater volume which provides a greater overall profit. Finally, the service provider may profit by charging the pilot a slight premium over the fuel supplier's volume-discounted price.

Embodiments may also provide tiered pricing. For example, a service provider may provide a pilot directly with volume pricing discounts (e.g., a first price for up to 1000 pounds of fuel, a second, lower price for at least 1001 up to 2000 pounds of fuel, etc.). The tiered pricing may provide further discount to pilots, and additional motivation for pilots to utilize the system to purchase reduce-price fuel through the service provider.

Embodiments may also provide for fuel tankering opportunities. Fuel tankering opportunity may be important for trips with multiple legs and may facilitate optimization of the fuel uploads along the trip route by taking on the maximum amount of fuel at a location that is less expensive than the FBOs in the latter trip legs. Determining tankering opportunities requires evaluation of several variables affecting all legs of a trip, including fuel prices at each FBO, the distance between airports, the number of trip legs, the aircraft attributes and payload, and the like. In the exemplary trip described above in relation to FIGS. 4 and 5, a tankering opportunity is determined to be available at KDAL because the fuel is sufficiently less expensive than that available of the FBOs at other airports that the total operating cost of the multi-leg trip is reduced sufficiently to make up for the additional fuel burn due to carrying the extra weight. In such instances, embodiments may calculate a maximum tankering volume (or weight) of fuel to upload to maintain a permissible total aircraft weight in view of payload, aircraft attributes, weather, elevation, and the like.

While the above described embodiments generally describe an optimized route that includes uploading fuel at one or more destination airport along a multi-destination route, embodiments may also specify one or more airports other than origin and destination airports to upload fuel at to further reduce operational costs. For example, in an embodiment a non-destination airport may offer fuel at a price sufficiently less than that offered at one or more destination airport such that the system determines that overall operating costs will be reduced by making the additional stop to upload the less expensive fuel. This may be the situation when a strategically located airport (e.g., one within a fuel search corridor) includes dedicated oil depots (i.e., fuel farms) that may offer reduced pricing for large volume fuel uploads. Such embodiments may take into consideration not only the time taken for the additional stop and upload, but also the additional fuel expended during the additional takeoff, weather factors, airport altitude, runway characteristics, flight level, the added weight of the additional fuel uploaded, and optionally additional or other parameters that affect the overall operating costs. Additionally, such embodiments may be limited to searching for airports within a fuel search corridor specified by the pilot (see FIG. 3).

Figure 8:
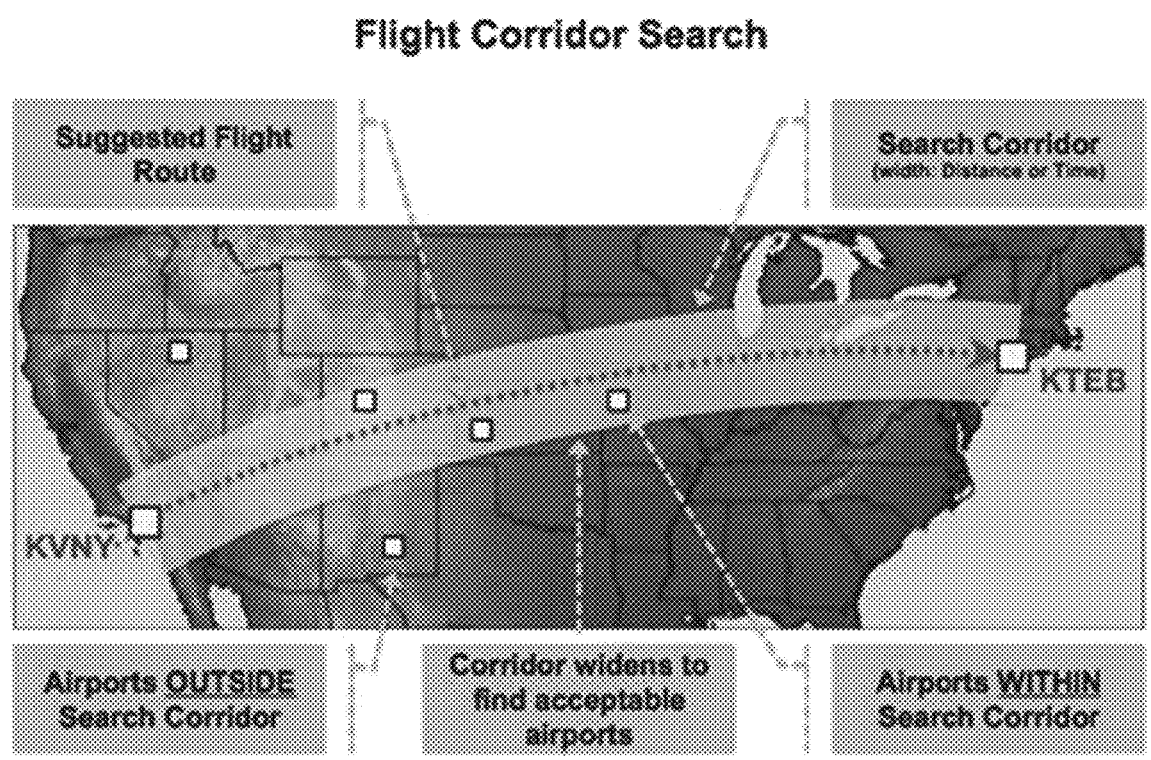
FIG. 8 illustrates an exemplary fuel search corridor that may be defined by a distance or time variance from the suggested flight route.

FIG. 8 illustrates an exemplary fuel search corridor that may be defined by a distance or time variance from the suggested flight route. As shown, the suggested flight route from KVNY to KTEB is a direct great-arc flight path. The fuel search corridor widens from the suggested flight route by a distance or time to define acceptable airports for uploading fuel. In some embodiments a user may define a fuel search corridor width (e.g., using the user interface shown in FIG. 3). In other embodiments, a fuel search corridor may be automatically determined based on a combination of elements of trip data and operational data to compute an optimized route. As shown, once the fuel search corridor is defined, embodiments may determine an optimized route that would minimize total operating costs by uploading fuel at a non-destination airport located within the search corridor. While FIG. 8 illustrates an exemplary fuel search corridor for a single-destination trip, embodiments may utilize fuel search corridors for any number of legs of a multi-destination trip as well.

Additionally, some embodiments may define different fuel search corridors for different legs of a multi-destination trip (e.g., one leg of a multi-leg trip may have scheduling limitations that do not allow for deviation far from the suggested flight route while another leg may have a more flexible schedule).

As shown above in FIGS. 5A-5C, embodiments may also determine environmental effects of various flight routes. For example, embodiments may determine the carbon dioxide emissions of a flight route. This may enable a pilot to make sure they comply with regulations relating to environmental emissions.

An alternative embodiment may provide a system for trading carbon credits. For example, a carbon credit trader may purchase carbon credits from one or more entities with an excess of carbon credits (e.g., from a wind-farm provider). The carbon trader may then sell the carbon credits to the pilots to provide sufficient credit for their optimized routes. The carbon trader may purchase the carbon credits from entities at a volume discount and thus offer the carbon credits to a pilot at a reduced cost in comparison to conventional government costs for carbon credits. Additionally, the carbon trader may sub-divide purchased carbon credits to sell carbon credits more closely aligned with the carbon needs of a pilot for a trip route than may otherwise be available.

Figure 7:
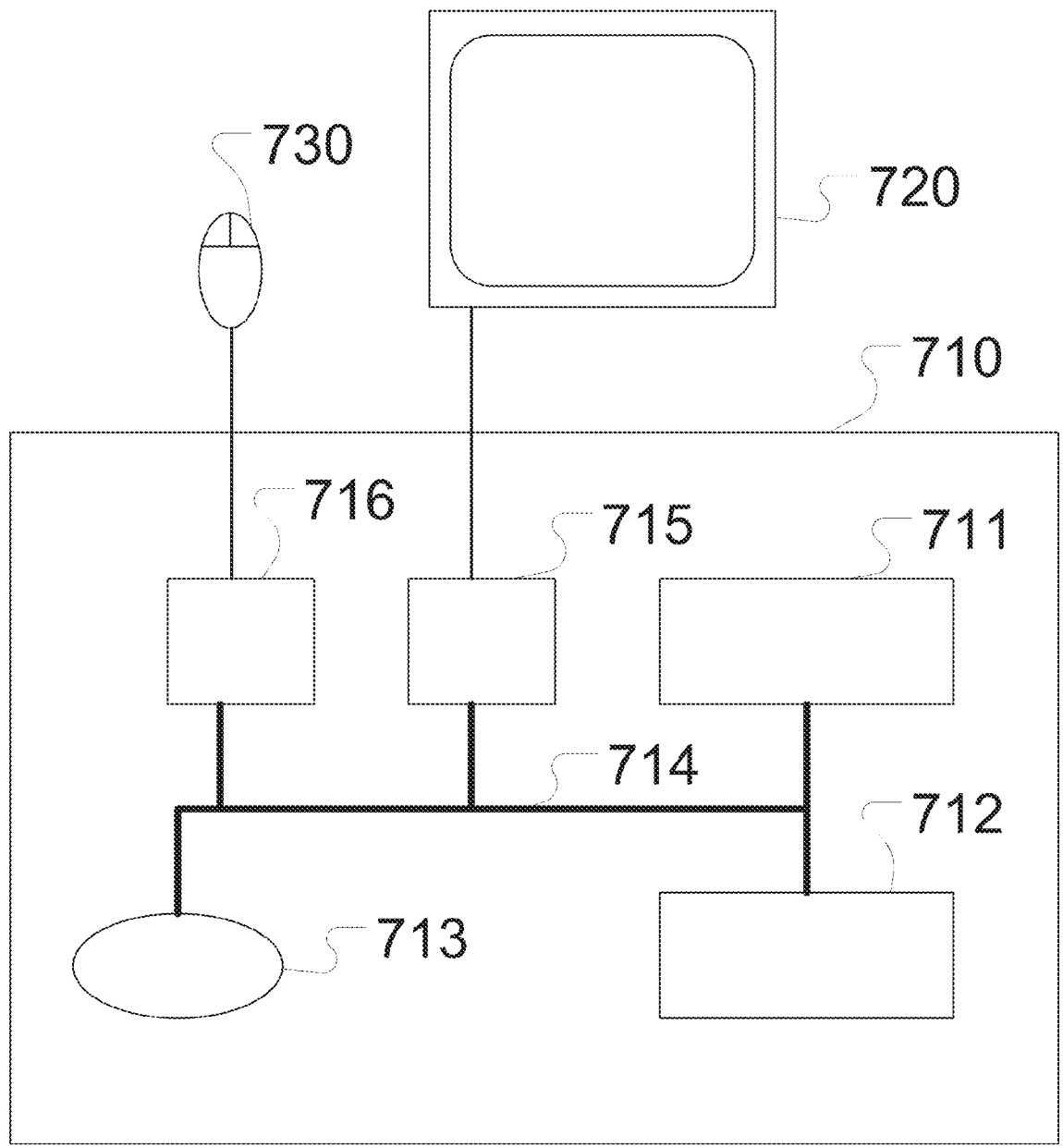
FIG. 7 shows an exemplary computing device useful for performing processes disclosed herein.

These embodiments may be implemented with software, for example modules executed on computing devices such as computing device 710 of FIG. 7. Of course, modules described herein illustrate various functionalities and do not limit the structure of any embodiments. Rather the functionality of various modules may be divided differently and performed by more or fewer modules according to various design considerations.

Computing device 710 has one or more processing device 711 designed to process instructions, for example computer-readable instructions (i.e., code) stored on a storage device 713. By processing instructions, processing device 711 may perform the steps and functions disclosed herein. Storage device 713 may be any type of storage device (e.g., an optical storage device, a magnetic storage device, a solid state storage device, etc.), for example a non-transitory storage device. Alternatively, instructions may be stored in one or more remote storage devices, for example storage devices accessed over a network or the Internet. Computing device 710 additionally may have memory 712, an input controller 716, and an output controller 715. A bus 714 may operatively couple components of computing device 710, including processor 711, memory 712, storage device 713, input controller 716, output controller 715, and any other devices (e.g., network controllers, sound controllers, etc.). Output controller 715 may be operatively coupled (e.g., via a wired or wireless connection) to a display device 720 (e.g., a monitor, television, mobile device screen, touch-display, etc.) in such a fashion that output controller 715 can transform the display on display device 720 (e.g., in response to modules executed). Input controller 716 may be operatively coupled (e.g., via a wired or wireless connection) to input device 730 (e.g., mouse, keyboard, touch-pad, scroll-ball, touch-display, etc.) in such a fashion that input can be received from a user.

Of course, FIG. 7 illustrates computing device 710, display device 720, and input device 730 as separate devices for ease of identification only. Computing device 710, display device 720, and input device 730 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 710 may be one or more servers, for example a farm of networked servers, a clustered server environment, or a cloud network of computing devices.

While the exemplary embodiments are generally described herein in the context of determining optimized routes for aircraft, alternative embodiments may be useful for determining optimized routes to reduce operating costs in many other contexts. For example, alternative embodiments may be utilized for automobiles (especially long-haul truckers), boats, trains, and the like.

Embodiments may also be useful for determining the overall operating cost of a trip. FIGS. 9A-9B illustrate details relating to operating costs of an air charter flight (i.e., a Part 135 flight). Specifically, FIG. 9A breaks down the direct operating costs per hour of a Part 135 flight and FIG. 9B breaks down third party fees affiliated with a Part 135 flight. Embodiments may utilize the above described systems for determining an optimized route in combination with systems for determining overall operating costs of a flight to compute a full operating budget for a flight. Of course, while FIGS. 9A and 9B illustrate details relating to a Part 135 flight, embodiments may be configured to determine overall operating costs of other types of aircraft as well. Embodiments may also utilize records systems to maintain historical records of operating costs of flights, to maintain an operating budget, and the like.

All publications and patent applications mentioned in this specification are herein incorporated by reference. Embodiments have been disclosed herein. However, various modifications can be made without departing from the scope of the embodiments as defined by the appended claims and legal equivalents.

What is claimed is:

1. A method, executed by one or more computing devices, for reducing operational costs relating to fuel burn of aircraft, the method comprising:
   receiving, by at least one of the one or more computing devices, trip data including an origin, an intermediate destination, a final destination, an aircraft, a payload, and a preexisting fuel amount from a client device;
   receiving, by at least one of the one or more computing devices, operational data including a set of airports including an origin airport corresponding to the origin, an intermediate destination airport corresponding to the intermediate destination, and a final destination airport corresponding to the final destination, a fuel price for each airport in the set of airports, and runway specifications for each airport in the set of airports;
   performing, by at least one of the one or more computing devices, optimization logic to determine an optimized route having a minimum fuel cost,
   wherein the optimized route indicates the amount of fuel to upload at each of the origin airport, the intermediate destination airport, and the final destination airport,
   wherein the optimization logic considers each of the preexisting fuel amount, a maximum takeoff fuel amount for the aircraft, a minimum reserve fuel amount for the aircraft, the payload, a fuel burn for the aircraft to travel from the origin airport to the intermediate destination airport, a fuel burn for the aircraft to travel from the intermediate destination airport to the final destination airport, and the price of fuel at each of the origin airport, the intermediate destination airport, and the final destination airport; and transmitting, by at least one of the one or more computing devices, the optimized route to the client device.

2. The method of claim 1, further comprising:
identifying an additional airport in the set of airports determined to be within a fuel search corridor;
determining whether the additional airport has a runway compatible with the aircraft;
determining whether adding a detour to the additional airport to upload fuel would reduce a total fuel cost based on an additional fuel burn required to detour to the additional airport and the price of fuel at the additional airport, and
adding the additional airport and an amount of fuel to be purchased at the additional airport to the optimized route if it is determined that the runway is compatible with the aircraft and that the detour would reduce the total fuel cost.

3. The method of claim 2, wherein the fuel search corridor is one of a time variance and a distance variance from a flight path from the origin airport to the intermediate destination airport to the final destination airport.

4. The method of claim 3, further comprising receiving one of the fuel search corridor time variance and the fuel search corridor distance variance from the client device.

5. The method of claim 2, further comprising receiving a time-based operating cost, wherein the step of determining whether adding the additional airport to the optimized route to purchase fuel would reduce the total fuel cost is also based on the operating cost of the detour to the additional airport.

6. The method of claim 1, wherein the step of receiving operational data includes receiving a fuel price for a plurality of fixed base operators at one or more airports in the set of airports having more than one fixed base operator;
the method further comprising determining a cheapest fixed base operator for each airport in the set of airports,
wherein the optimization logic considers the cheapest fixed base operator for each airport, and
wherein the optimized route indicates the cheapest fixed base operator at each airport having a plurality of fixed base operators.

7. The method of claim 1, wherein the origin received from the client device is the origin airport.

8. A system for reducing operational costs relating to fuel burn of aircraft comprising:
a memory; and
a processor coupled to the memory, the processor configured for:
receiving trip data including an origin, an intermediate destination, a final destination, an aircraft, a payload, and a preexisting fuel amount from a client device;
receiving operational data including a set of airports including an origin airport corresponding to the origin, an intermediate destination airport corresponding to the intermediate destination, and a final destination airport corresponding to the final destination, a fuel price for each airport in the set of airports, and runway specifications for each airport in the set of airports;
performing optimization logic to determine an optimized route having a minimum fuel cost,
wherein the optimized route indicates the amount of fuel to upload at each of the origin airport, the intermediate destination airport, and the final destination airport,
wherein the optimization logic considers each of the preexisting fuel amount, a maximum takeoff fuel amount for the aircraft, a minimum reserve fuel amount for the aircraft, the payload, a fuel burn for the aircraft to travel from the origin airport to the intermediate destination airport, a fuel burn for the aircraft to travel from the intermediate destination airport to the final destination airport, and the price of fuel at each of the origin airport, the intermediate destination airport, and the final destination airport; and
transmitting the optimized route to the client device.

9. The system of claim 8, the processor further configured for:
identifying an additional airport in the set of airports determined to be within a fuel search corridor;
determining whether the additional airport has a runway compatible with the aircraft;
determining whether adding a detour to the additional airport to upload fuel would reduce a total fuel cost based on an additional fuel burn required to detour to the additional airport and the price of fuel at the additional airport, and
adding the additional airport and an amount of fuel to be purchased at the additional airport to the optimized route if it is determined that the runway is compatible with the aircraft and that the detour would reduce the total fuel cost.

10. The system of claim 9, wherein the fuel search corridor is one of a time variance and a distance variance from a flight path from the origin airport to the intermediate destination airport to the final destination airport.

11. The system of claim 10, the processor further configured for receiving one of the fuel search corridor time variance and the fuel search corridor distance variance from the client device.

12. The system of claim 9, the processor further configured for receiving a time-based operating cost, wherein the step of determining whether adding the additional airport to the optimized route to purchase fuel would reduce the total fuel cost is also based on the operating cost of the detour to the additional airport.

13. The system of claim 8, wherein the step of receiving operational data includes receiving a fuel price for a plurality of fixed base operators at one or more airports in the set of airports having more than one fixed base operator;
the processor further configured for determining a cheapest fixed base operator for each airport in the set of airports,
wherein the optimization logic considers the cheapest fixed base operator for each airport, and
wherein the optimized route indicates the cheapest fixed base operator at each airport having a plurality of fixed base operators.

14. A non-transitory computer-readable medium having computer-readable code stored thereon that, when executed by a computing device, performs a method for reducing operational costs relating to fuel burn of aircraft, the method comprising:
receiving trip data including an origin, an intermediate destination, a final destination, an aircraft, a payload, and a preexisting fuel amount from a client device;
receiving operational data including a set of airports including an origin airport corresponding to the origin, an intermediate destination airport corresponding to the intermediate destination, and a final destination airport corresponding to the final destination, a fuel price for each airport in the set of airports, and runway specifications for each airport in the set of airports;
performing optimization logic to determine an optimized route having a minimum fuel cost,
wherein the optimized route indicates the amount of fuel to upload at each of the origin airport, the intermediate destination airport, and the final destination airport, wherein the optimization logic considers each of the preexisting fuel amount, a maximum takeoff fuel amount for the aircraft, a minimum reserve fuel amount for the aircraft, the payload, a fuel burn for the aircraft to travel from the origin airport to the intermediate destination airport, a fuel burn for the aircraft to travel from the intermediate destination airport to the final destination airport, and the price of fuel at each of the origin airport, the intermediate destination airport, and the final destination airport; and transmitting the optimized route to the client device.

15. The medium of claim 14, the method further comprising:

identifying an additional airport in the set of airports determined to be within a fuel search corridor;

determining whether the additional airport has a runway compatible with the aircraft;

determining whether adding a detour to the additional airport to upload fuel would reduce a total fuel cost based on an additional fuel burn required to detour to the additional airport and the price of fuel at the additional airport, and adding the additional airport and an amount of fuel to be purchased at the additional airport to the optimized route if it is determined that the runway is compatible with the aircraft and that the detour would reduce the total fuel cost.

16. The medium of claim 15, wherein the fuel search corridor is one of a time variance and a distance variance from a flight path from the origin airport to the intermediate destination airport to the final destination airport.

17. The medium of claim 16, the method further comprising receiving one of the fuel search corridor time variance and the fuel search corridor distance variance from the client device.

18. The medium of claim 15, the method further comprising receiving a time-based operating cost, wherein the step of determining whether adding the additional airport to the optimized route to purchase fuel would reduce the total fuel cost is also based on the operating cost of the detour to the additional airport.

19. The medium of claim 14, wherein the step of receiving operational data includes receiving a fuel price for a plurality of fixed base operators at one or more airports in the set of airports having more than one fixed base operator;

the method further comprising determining a cheapest fixed base operator for each airport in the set of airports, wherein the optimization logic considers the cheapest fixed base operator for each airport, and wherein the optimized route indicates the cheapest fixed base operator at each airport having a plurality of fixed base operators.

20. The medium of claim 14, the method further comprising receiving a time-based operating cost, wherein the step of performing optimization logic is also based on the operating cost of the time required to upload fuel at more than one airport.

* * * * *